(12) United States Patent
Pedersen et al.

(10) Patent No.: US 6,504,605 B1
(45) Date of Patent: *Jan. 7, 2003

(54) METHOD AND APPARATUS FOR DETERMINING THE COORDINATES OF AN OBJECT

(75) Inventors: Paul S Pedersen, Los Alamos, NM (US); Robert Sebring, Santa Fe, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,811

(22) Filed: Oct. 24, 2000

(51) Int. Cl.⁷ ............................ G01B 11/26; G01C 1/00; G01C 17/00; G01C 19/00; G01C 9/00; G06F 15/00; G06K 9/00
(52) U.S. Cl. ...................... 356/141.1; 702/152; 382/154
(58) Field of Search ....................... 356/141.1, 602–603; 702/152, 150–153; 382/154

(56) References Cited

U.S. PATENT DOCUMENTS

| 4,349,277 | A |   | 9/1982 | Mundy et al. |
|---|---|---|---|---|
| 4,564,295 | A |   | 1/1986 | Halioua |
| 4,641,972 | A |   | 2/1987 | Halioua |
| 4,657,394 | A | * | 4/1987 | Halioua ........................ 356/376 |
| 4,802,759 | A |   | 2/1989 | Matsumoto et al. |
| 5,085,502 | A |   | 2/1992 | Womack et al. |
| 5,289,264 | A |   | 2/1994 | Steinbichler |
| 5,636,025 | A |   | 6/1997 | Bieman et al. |
| 5,784,098 | A |   | 7/1998 | Shoji et al. |
| 5,864,145 | A |   | 1/1999 | Krimermann et al. |
| 5,870,180 | A | * | 2/1999 | Wangler ........................ 356/401 |
| 5,880,846 | A |   | 3/1999 | Hasman et al. |
| 5,929,980 | A |   | 7/1999 | Yamaguchi et al. |
| 6,012,003 | A |   | 1/2000 | Astrom |
| 6,031,612 | A |   | 2/2000 | Shirley |
| 6,055,056 | A |   | 4/2000 | Kuchmstedt et al. |
| 6,369,879 | B1 | * | 4/2002 | Pedersen ........................ 356/3.01 |

* cited by examiner

*Primary Examiner*—Thomas H. Tarcza
*Assistant Examiner*—Brian K Andrea
(74) *Attorney, Agent, or Firm*—John P. O'Banion

(57) ABSTRACT

A method and apparatus is described for determining the coordinates on the surface of an object which is illuminated by a beam having pixels which have been modulated according to predetermined mathematical relationships with pixel position within the modulator. The reflected illumination is registered by an image sensor at a known location which registers the intensity of the pixels as received. Computations on the intensity, which relate the pixel intensities received to the pixel intensities transmitted at the modulator, yield the proportional loss of intensity and planar position of the originating pixels. The proportional loss and position information can then be utilized within triangulation equations to resolve the coordinates of associated surface locations on the object.

33 Claims, 3 Drawing Sheets

METHOD AND APPARATUS FOR DETERMINING THE COORDINATES OF AN OBJECT

STATEMENT REGARDING FEDERALLY SPONSORED RESEARCH OR DEVELOPMENT

This invention was made with Government support under Contract No. W-7405-ENG-36, awarded by the Department of Energy. The Government has certain rights in this invention.

CROSS-REFERENCE TO RELATED APPLICATIONS

Not Applicable

REFERENCE TO A MICROFICHE APPENDIX

Not Applicable

BACKGROUND OF THE INVENTION

1. Field of the Invention

The invention pertains generally to methods for determining the position and surface contours of an object and, more particularly, to a method for determining surface coordinates by directing intensity modulated illumination toward the surface of an object and mathematically resolving the reflected intensity pattern into position and distance relative to the modulated illumination, whereupon the object coordinates may then be determined by triangulation.

2. Description of the Background Art

Numerous applications require determining the coordinates of an object's surface, or the coordinates of reflective elements beneath that surface. Typical application areas include industrial plants, laboratories, microscopy, and the metrology field in general. Various optical methods have been employed which utilize arrangements of light sources to detect contour information. These methods are often employed within instruments such as coordinate measuring machines, three-dimensional topometric sensors, and laser triangulation sensors. One common method of performing surface coordinate measurements is to project a lighted grid of squares onto the surface of an artifact, capture the reflected image on an image sensor, and then analyze the image data. The distortion of the grid within the image may be analyzed to discern the shape of the object. The grid lines may be mapped to ascertain the angles of the beams and the coordinates of the points of intersection. Triangulation is typically utilized during the process of calculating the coordinates of the object points once sufficient angle and position data is obtained.

It will be appreciated that a right triangle can be resolved given any two sides, or an angle and a side. FIG. 1 is a two-dimensional diagram of triangulation being performed to resolve the position of point P', wherein a ray of light from a known location and direction P, is reflected from the surface of the object at point P' and is detected at a location P". A pair of right triangles is formed which may be solved if the distance or additional angular information is given. By solving for the pair of right triangles, the coordinates of points on the surface of the object may then be determined.

Methods of determining object coordinates often rely on a method of scanning the surface of the object point-by-point or line-by-line, and resolving the point positions of the object serially. However, sequential methods of plotting the coordinates of an object surface are slow and not well suited for use on vibrating or moving objects. The coordinates of object points may also be determined by creating interference patterns in the region near the surface using multiple illumination sources, such that the reflected patterns disclose changes in field depth as a series of interference fringes. In another method, predetermined displacements of a projected light grid having a sinusoidal pattern are mechanically generated, as by rotating an aperture. The reflected light from the object is detected by an image sensor so that the response to the angular displacement for the aperture is evaluated by a phase-shift method (or Fourier transform) to determine the incoming angle of the light. The object location is then solved by triangulation. The two grating positions may be generated simultaneously using multiple wavelengths of light, such as colors in the visible spectrum, which are resolved by a detector individually responsive to each of the wavelengths. The utility of this technique and its accuracy are dependent on the surface characteristics of the object and require substantial precision with regard to the gratings and their rotation.

The aforementioned methods of determining the coordinates of an object surface suffer from a number of drawbacks, such as being typically slow, while many of the methods inherently lack mathematical precision. Therefore, a need exists for an efficient method of determining object position under a variety of conditions and which does not rely on image distortion, sequential scanning, interference patterns, or pixel position rotations. The present invention satisfies those needs, as well as others, and overcomes the deficiencies of previously developed solutions.

BRIEF SUMMARY OF THE INVENTION

The present invention is directed to a method for determining the three-dimensional coordinates of points located on the surface of an object. By way of example, and not of limitation, a light source, an optical intensity modulator, two lens systems, and a charge coupled device camera having a large number of optically sensitive pixels, are positioned in such a manner that the illumination is directed through the intensity modulator and the first lens system onto the surface of the object from which it is reflected through the second lens system onto the camera. The intensity modulator preferably comprises a liquid crystal window having a plurality of pixels whose transmittance qualities are independently adjustable from opaque to transparent. The illumination passing through the intensity modulator is modulated according to at least three mathematical relationships of pixel position. Calculations are performed on the illumination received at the pixels of the camera to resolve the distance and position of the associated pixels at the intensity modulator. The location of coordinates on the object from which the illumination is reflected may then be determined based on well known triangulation calculations.

Accordingly, the invention is a simplified method for determining the location of the points on the surface of an object by varying, in accord with mathematical formulas, the intensity of illuminated pixels directed to the object surface, and performing calculations on the intensity of reflected illumination in relation with the mathematical formulas to resolve the coordinates of the object surface An object of the invention is to optically determine the absolute position of points on an object by varying the intensity of illumination projected onto the object.

Another object of the invention is to provide a convenient method for the simultaneous registration of reflected pixels over an area of the object illuminate by a modulated beam so as to speed the process of coordinate mapping.

Another object of the invention is to provide a method for mapping the surface coordinates of an object without the need of complex equipment.

Another object of the invention is to provide a method for rapidly resolving the surface coordinates of an object.

Another object of the invention is to provide a method of determining the coordinates of an object without the use of rotating illumination grids.

Another object of the invention is to provide a method of mapping the surface coordinates of an object that may be implemented with available low-cost components.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
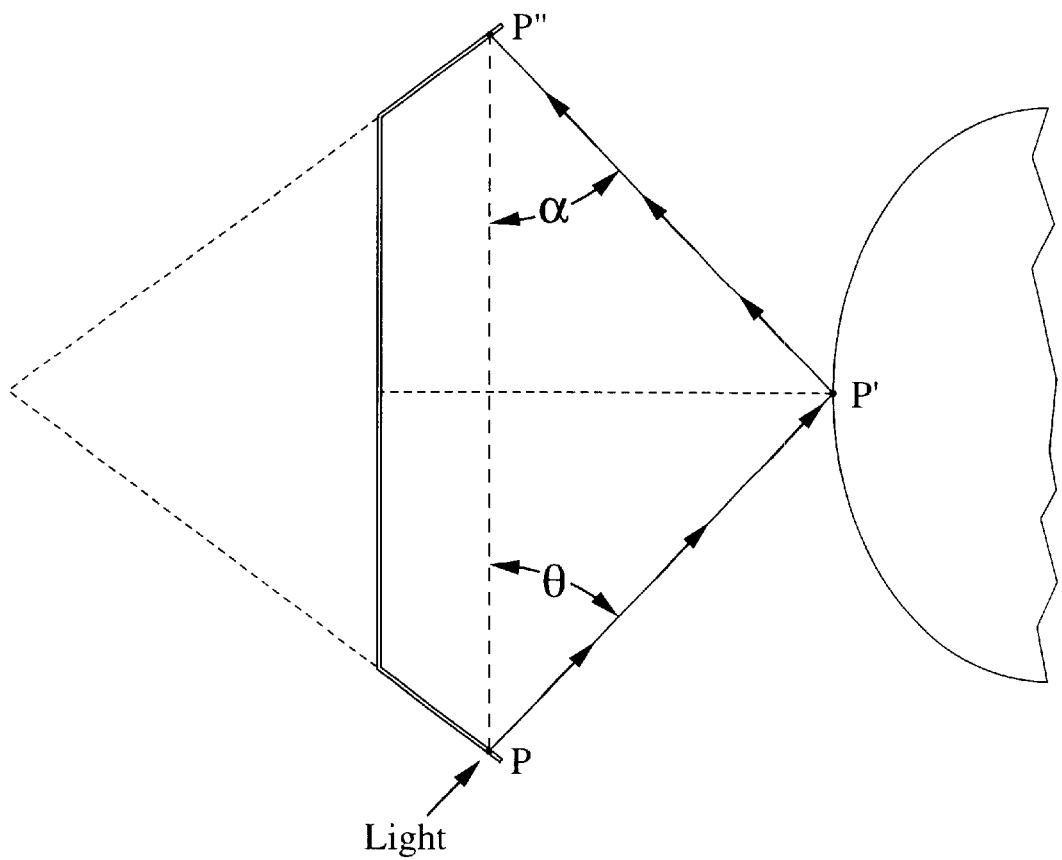
FIG. 1 is a diagram illustrating conventional triangulation for resolving the position of a point on the surface of an object.
Figure 2:
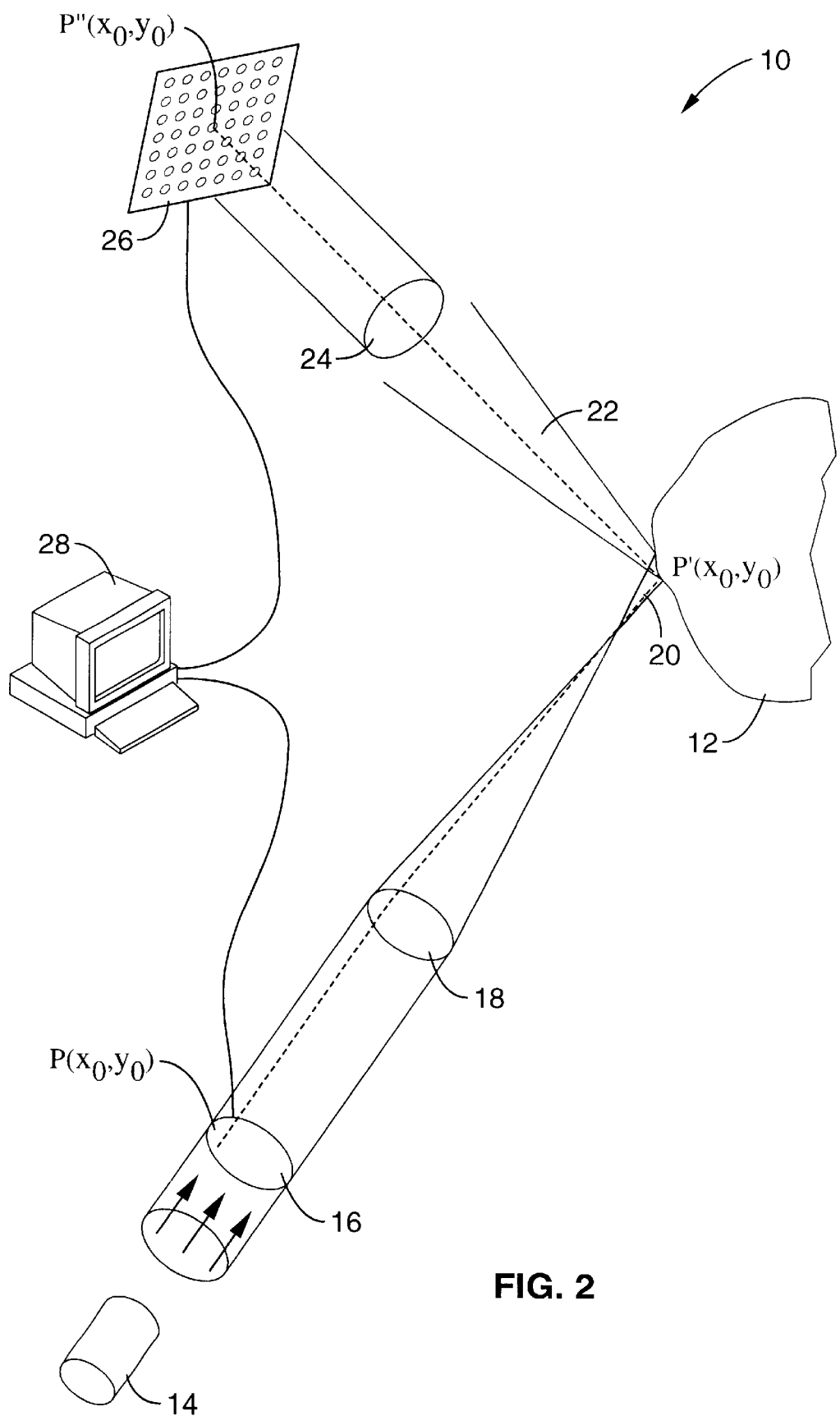
FIG. 2 is a schematic of optical components within an apparatus for determining the coordinates of an object according to an embodiment of the present invention.
Figure 3:
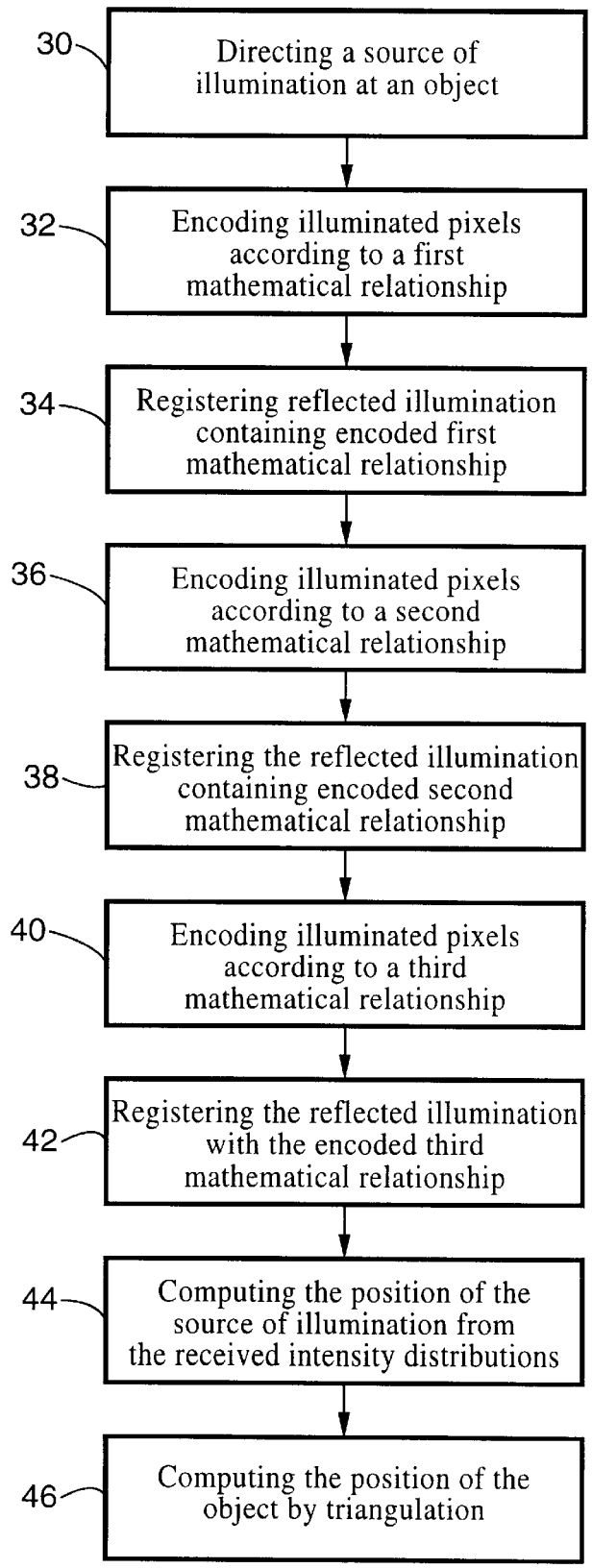
FIG. 3 is a flowchart of a method for determining coordinates of an object according to an embodiment of the present invention shown describing a sequential encoding method for the mathematical relationships within the pixels of the illumination source.

Referring more specifically to the drawings, for illustrative purposes the present invention is embodied in the apparatus and method generally shown in FIG. 2 and FIG. 3. It will be appreciated that the apparatus may vary as to configuration and as to details of the parts, and that the method may vary as to the specific steps and sequences, without departing from the basic concepts as disclosed herein.

Referring to FIG. 2, an apparatus 10 for determining the location of coordinate points on an object 12 by performing calculations on the reflected intensity according to the present invention is shown schematically. The apparatus includes a source of illumination 14, which is preferably a visible white light source, although any form of illumination may be utilized, such as a visible laser light source, or an infrared source. The illumination source passes through an optical intensity modulator 16, which is preferably a liquid crystal window having a system of pixels, typically arranged in an array, whose light transmittance qualities are independently adjustable from opaque to transparent. Alternatively, a sequence of optical discs may be utilized which provide known optical transmission variations relative to position on the disc. Intensity modulator 16 provides intensity control for individual pixels of the illumination. The illumination passes through the plane of intensity modulator 16, at P, as rays which are orthogonal to the plane of the intensity modulator. The intensity modulator is preferably computer-controlled, although it may be hard-wired. Alternatively, the intensity modulator may comprise an illumination source which is capable of intensity modulation, such as an array of laser diodes. It should be appreciated that various methods exist for providing controlled modulation of illumination.

The beam of illumination is collected by a lens 18 to be focused on an area 20 impinging on object 12, at P'. The illumination impinging on the object may be considered a collection of points in relation to the pixels of modulated illumination being transmitted through intensity modulator 16. Reflected illumination 22 from the surface of object 12 is received by a lens 24 and directed onto an image sensor 26, preferably a charge coupled device (CCD) camera or the like. A computer 28 is shown connected to the intensity modulator 16 to control the pixel intensities therein, and to CCD 26 for receiving pixel intensity information. It will be appreciated that although the use of a computer system is preferred, any device or combination of hardware capable of performing the calculations may be utilized.

One ray of the illumination is shown by the dashed line passing through intensity modulator 16 at a location $P(x_0,y_0)$ to impinge on the object at a point $P'(x_0,y_0)$ and reflected off of object 12 through lens 24 and received at position $P''(x_0,y_0)$ on CCD 26. The plane of the CCD is generally configured orthogonal to the incoming illumination whose reflected angle from the object is equal to the angle of incidence. The CCD may further be adapted to restrict the receipt of spurious illumination from locations other than the object surface being illuminated.

It will be appreciated that lenses 18, 24 are utilized to provide a mechanism for obtaining high resolution coordinate positions from the surface of the object. However, it will also be recognized that in lower-resolution applications the lenses will be unnecessary if the source of illumination is properly configured.

The present invention is capable of determining the position and distance of each pixel at P on intensity modulator 16 which corresponds to locations of pixels received at P'' on the CCD imager. The coordinates of a pixel on intensity modulator 16 can be determined despite the losses of illumination intensity due to the intervening spaces, and absorption within the lens and object. The losses are represented by a value $D(x_0,y_0)$ which is proportional to the sum of these losses.

A ray of light R from illumination source 14 traverses the apparatus as follows:

$$R \to M \to L_1 \to A \to L_2 \to CCD \quad (1)$$

where M represents intensity modulator 16, $L_1$ represents first lens 18, A represents the artifact (object) 12, $L_2$ represents second lens 24 for directing the reflected light, and CCD represents the charge-coupled device image sensor 26 capturing the reflected light. Based on the foregoing, the illumination intensity received at the CCD pixel P'' which corresponds to the illumination intensity originating from $P(x_0,y_0)$ has the form:

$$I(CCD(x_0,y_0)) = D(x_0,y_0) \times I(P(x_0,y_0)) \quad (2)$$

where $D \neq 0$ and the coordinates $(x_0,y_0)$ are chosen to be strictly positive for all points on P. The algorithm utilizes the fact that the illumination intensity received by the CCD is proportional to the intensity at the modulator at P, having a constant of proportionality $D(x_0,y_0)$ that is a function of the origin $P(x_0,y_0)$. Therefore, if the illumination intensity at point P is decreased by a factor of two, the illumination intensity at the CCD will accordingly decrease by a factor of two. For each pixel received at the CCD, three unknown values exist $x_0$, $y_0$ and $D(x_0,y_0)$ which can be determined according to the methods of the present invention. The values $x_0$ and $y_0$ are the coordinates of the corresponding pixel at intensity modulator 16, while the value $D(x_0,y_0)$ is proportional to the loss of light intensity along the path for a particular ray of illumination from $P(x_0,y_0)$. By varying the transmittance values of the modulator in accord with at least three known functions at each pixel position, the unknowns $x_0$, $y_0$ and $D(x_0,y_0)$ may be solved for the illumination received at the CCD.

The illumination intensity may be varied according to any of numerous mathematical functions to allow resolving the unknown quantities. In one embodiment of the invention, the transmittance at the pixels of the modulator is varied according to a linear relationship with x, a linear relationship with y, and a quadratic relationship with x. The relationships are given by:

$$I_1(P(x_0,y_0)) = \alpha_1 \times x_0 \tag{3}$$

$$I_2(P(x_0,y_0)) = \alpha_2 \times y_0 \tag{4}$$

$$I_3(P(x_0,y_0)) = \alpha_3 \times x_0^2 \tag{5}$$

where $\alpha_1$, $\alpha_2$ and $\alpha_3$ are positive constants. By varying the transmitted illumination intensity according to the above three relationships, the resulting intensities at the modulator with respect to the illumination received by the CCD are then given by:

$$I_1 = I_1(CCD, x_0, y_0) = D(x_0, y_0) \times \alpha_1 \times x_0 \tag{6}$$

$$I_2 = I_2(CCD, x_0, y_0) = D(x_0, y_0) \times \alpha_2 \times y_0 \tag{7}$$

$$I_3 = I_3(CCD, x_0, y_0) = D(x_0, y_0) \times \alpha_3 \times x_0^2 \tag{8}$$

The unknown quantities for the pixels of received illumination at the CCD are then computed as follows:

$$x_0 = \frac{a_1 \times I_3}{a_3 \times I_1} \tag{9}$$

$$y_0 = \frac{a_1^2 \times I_2 \times I_3}{a_2 \times a_3 \times I_1^2} \tag{10}$$

$$D(x_0, y_0) = \frac{a_3 \times I_1^2}{a_1^2 \times I_3} \tag{11}$$

It should be appreciated that the values for $I_1$, $I_2$, and $I_3$ are required to be non-zero in order to resolve the unknowns. As a result of varying the intensity of each pixel within the illuminating beam to follow these three functions, the position and intensity proportionality constant of the corresponding pixel at the modulator can be resolved from the image received at the CCD. With these unknowns solved for the illumination received at the CCD, the coordinates of the object, to which these multiple rays of illumination impinge, may be solved by conventional triangulation methods.

Referring now to FIG. 3, a flowchart is shown of the process steps for resolving object coordinates according to the present invention. At block 30, an illumination source is directed toward an object. At block 32, the illumination source is encoded as pixels of illumination having an intensity pattern according to a first mathematical relationship. The reflected illumination containing the first mathematical relationship is registered at the image sensor at block 34. A second intensity pattern is encoded according to a second mathematical relationship at block 36, and its reflection is registered by the image sensor at block 38. A third intensity pattern is encoded according to a third mathematical relationship at block 40, and again its reflection is registered by the image sensor at block 42. After, or during, the registration of the three reflected patterns, the position of the source of modulated illumination is computed from the received intensity distributions at block 44. Utilizing these values within the trigonometric relationships the coordinate positions of the object surface are thereby computed by triangulation at block 46.

It should be appreciated that the described embodiment and equations are a single aspect of the inventive method. It will be recognized that the modulated illumination source may provide a controlled areal illumination according to the three formulas as described, or may provide a point-by-point or scanned illumination. In addition, the calculations which are described in relation to the intensity at the modulator may be replaced by a calculation of intensity given at a location of known, or measured, intensity between the source of modulated illumination and the object surface. Furthermore, three specific equations were given for modulating the illumination, however, a variety of equations can be utilized for modulating the illumination intensity which allow the three unknowns to be solved given at least three modulation functions.

In general terms, the illumination intensity $I_n$ is modulated in accord with pixel position on the modulator $P(x_0,y_0)$ as follows:

$$I_1(P(x_0,y_0)) = f(x_0,y_0) \tag{12}$$

$$I_2(P(x_0,y_0)) = g(x_0,y_0) \tag{13}$$

$$I_3(P(x_0,y_0)) = h(x_0,y_0) \tag{14}$$

where $f(x_0,y_0)$, $g(x_0,y_0)$, $h(x_0,y_0)$ are three differentiable functions selected so that the differential equation:

$$\frac{\partial f}{\partial x}\frac{\partial g}{\partial y}h + \frac{\partial h}{\partial x}\frac{\partial f}{\partial y}g + \frac{\partial g}{\partial x}\frac{\partial h}{\partial y}f - \frac{\partial f}{\partial x}\frac{\partial h}{\partial y}g - \frac{\partial g}{\partial x}\frac{\partial f}{\partial y}h - \frac{\partial h}{\partial x}\frac{\partial g}{\partial y}f \tag{15}$$

is non-zero for all values of $(x_0,y_0)$ at the point of intensity modulation P. The present invention, therefore, provides a method of determining the coordinates of an object by modulating the intensity of an illumination source while registering intensity of the reflected illumination. The method can be implemented to generate an illuminated beam with pixels modulated in a variety of ways and is capable of resolving the position and distance of the source pixels so that coordinates of an object may be determined by triangulation. It will be appreciated that the teachings of the present invention are generally applicable for use with alternative pixel modulation forms, for example simultaneous intensity modulation within discrete wavebands, modulating the phase, modulating the polarization of light, and other similar encoding methods.

Although the description above contains many specificities, these should not be construed as limiting the scope of the invention but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for determining the coordinates of an object, comprising:
    (a) a modulated light source having pixels whose light intensity may be individually modulated, wherein said light source is directed toward said object;
    (b) an image detector having a plurality of pixels for receiving light reflected from said object; and
    (c) means for determining the coordinates of points wherefrom pixels of light are reflected from the surface of said object, wherein the determination is responsive to the relative location and intensity of pixels registered on said imaging detector such that the relative intensities are mathematically correlated with the modulation of the light source to resolve the proportional loss of light intensity and the position of said pixels at said modulated light source and from which the location of the associated point of reflection may be determined by triangulation.

2. An apparatus as recited in claim 1, wherein said coordinate determining means comprises a computer system configured for controlling the modulated light source and which receives pixel intensity information from the image detector such that calculations may be performed relating a sequence of modulated light intensity patterns with received light intensity patterns to determine object coordinates.

3. An apparatus for determining the coordinates of an object by sensing reflected illumination intensities, comprising:
    (a) means for emitting an illuminating beam toward an object, said beam having an area defined by a plurality of pixels;
    (b) means for modulating the intensity of individual pixels in said illuminating beam;
    (c) means for detecting the illumination intensity of the illuminating beam which has been reflected from points on said object; and
    (d) means for resolving the proportional loss of light intensity and the position of each pixel at the point of modulation from detected pixel illumination intensities, from which the coordinates of said object may be resolved by triangulation.

4. An apparatus as recited in claim 3, wherein said emitting means comprises a high-intensity illumination source.

5. An apparatus as recited in claim 3, wherein said modulating means comprises a transmissive LCD array having pixels whose transmissivity may be varied.

6. An apparatus as recited in claim 3, wherein said detecting means comprises a CCD camera.

7. An apparatus as recited in claim 3, wherein said resolving means comprises a computer system configured for controlling the intensity of the illuminating pixels and receiving pixel intensity information from the detecting means, and further configured for determining the coordinates of said object by triangulation.

8. An apparatus for determining the coordinates of points on an illuminated object by sensing the intensity of reflected illumination, comprising:
    (a) a source of illumination having a plurality of pixels whose intensity $I_n$ may be individually modulated according to at least three mathematical relationships;
    (b) an image sensor positioned to receive said source of illumination as it reflects from the object; and
    (c) a computer processor coupled to said intensity modulator and said image sensor, said computer processor solving simultaneous equations relating illumination intensity to pixel position such that the proportional loss of light intensity and associated location at the point of modulation of each registered pixels is resolved and from which the coordinates of object points may then be determined by triangulation.

9. An apparatus as recited in claim 8, wherein the illumination from said source of illumination comprises at least one wavelength band of radiation within the electromagnetic spectrum.

10. An apparatus as recited in claim 8, wherein pixel intensities are modulated according to mathematical formulas which comprise a first linear pattern, a second linear pattern, and a quadratic pattern.

11. An apparatus as recited in claim 8, wherein the intensity of the pixels may be modulated by passing a beam of illumination through an intensity modulator, such as an LCD, which is capable of selectively transmitting all or a portion of the wavelength constituents of the illumination.

12. An apparatus as recited in claim 8, wherein the intensity $I_n$, specified for a point $P(x_0,y_0)$ at which the pixels are intensity modulated, is determined according to at least three formulas exemplified as f, g, and h which relate pixel position (x, y) with intensity:

$$I_1(P(x_0,y_0)) = f(x_0,y_0)$$

$$I_2(P(x_0,y_0)) = g(x_0,y_0)$$

$$I_3(P(x_0,y_0)) = h(x_0,y_0).$$

13. An apparatus as recited in claim 12, wherein determining the position of the illumination source is performed by solving differentiable functions $n(x_0,y_0)$ where n represents exemplified functions f, g, h:

$$\frac{\partial f}{\partial x}\frac{\partial g}{\partial y}h + \frac{\partial h}{\partial x}\frac{\partial f}{\partial y}g + \frac{\partial g}{\partial x}\frac{\partial h}{\partial y}f - \frac{\partial f}{\partial x}\frac{\partial h}{\partial y}g - \frac{\partial g}{\partial x}\frac{\partial f}{\partial y}h - \frac{\partial h}{\partial x}\frac{\partial g}{\partial y}f \neq 0.$$

14. An apparatus as recited in claim 8, wherein the illumination intensity $I_n$ is modulated at a point of modulation $P(x_0,y_0)$, to express the following relationships, in which $\alpha_1$, $\alpha_2$, $\alpha_3$ are non-zero constants, and $x_0$, $y_0$ are non-zero:

$$I_1(P(x_0,y_0)) = \alpha_1 \times x_0$$

$$I_2(P(x_0,y_0)) = \alpha_2 \times y_0$$

$$I_3(P(x_0,y_0)) = \alpha_3 \times x_0^2.$$

15. An apparatus as recited in claim 14, wherein the computer processor performs computations on pixel intensity and location as received by the sensor at location (CCD,$x_0,y_0$), wherein the following equations are solved for measured illumination intensity to determine position P($x_0$, $y_0$) and proportional loss of light intensity D($x_0,y_0$) for the point of modulation, as given by:

$$x_0 = \frac{a_1 \times I_3}{a_3 \times I_1}$$

$$y_0 = \frac{a_1^2 \times I_2 \times I_3}{a_2 \times a_3 \times I_1^2}$$

$$D(x_0, y_0) = \frac{a_3 \times I_1^2}{a_1^2 \times I_3}$$

from which the coordinates of the object may then be calculated by geometric triangulation.

16. An apparatus for determining the coordinates of an object, comprising:
   (a) a source of illumination;
   (b) an optical intensity modulator, said optical intensity modulator configured to receive illumination from said illumination source, said optical intensity modulator having pixels whose transmissivity may be set according to a mathematical relationship with pixel position within the modulator;
   (c) a computer that is adapted to interface with the optical intensity modulator and is configured to output a control signal to the optical intensity modulator, wherein the control signal is related to said mathematical relationship and is adapted to set said transmissivity of each one of said pixels so that each one of said pixels can be distinguished from other ones of said pixels;
   (d) a first lens system, positioned to receive illumination which passes through said optical intensity modulator;
   (e) a second lens system, positioned to receive illumination originating from the source of illumination that has reflected from an area on the surface of the object whose surface coordinates are to be determined;
   (f) an imaging device positioned to receive illumination from the second lens system, said imaging device having pixels capable of registering the intensity of the illumination received; and
   (g) means for determining the coordinates on the surface of said object by resolving a sequence of intensity patterns created by the optical intensity modulator with the intensity patterns received upon the imaging device.

17. An apparatus as recited in claim 16, wherein the pixels of the optical intensity modulator are varied according to mathematical relationships of pixel position, and wherein the coordinates on the surface of said object are determined by determining proportional intensity loss and relative location of the modulated pixels at the intensity modulator and using the distance and position information to solve for coordinate positions by triangulation.

18. A method for determining the coordinates of an object, comprising:
   projecting a light through an optical intensity modulator onto the object, wherein the optical intensity modulator comprises a plurality of pixels whose transmissivity may be individually set;
   using a computer to generate a computer-derived output signal related to a mathematical relationship, wherein the transmissivity of each one of said pixels is modulated according to the computer-derived output signal to create a sequence of light intensity patterns so that each one of said pixels can be distinguished from other ones of said pixels;
   receiving said light which has been reflected from said object onto an imaging device; and
   determining the coordinates on said object at least in part by resolving the mathematical relationships between the sequence of mathematical light intensity patterns transmitted through the optical intensity modulator with the light intensities received at the imaging device, wherefrom the object position may be then determined by triangulation.

19. A method of obtaining object coordinates by sensing reflected illumination, comprising:
   illuminating an object with a beam of electromagnetic radiation having a plurality of pixels whose intensity is individually modulated according to at least three mathematical functions of pixel position within the beam;
   registering the location and intensity of the electromagnetic radiation reflected from the object at a sensor in response to the intensity of each of the modulated pixels;
   determining the associated position for each pixel at the point of intensity modulation and the proportion loss of light intensity for the pixels by resolving the simultaneous equations relating pixel illumination intensity at the sensor location; and
   determining object coordinates from the computed proportion loss of light intensity and pixel position by geometric triangulation.

20. A method as recited in claim 19, wherein the three mathematical functions of intensity $I_n$ relating to pixel position (x,y) within the beam at the intensity modulator P($x_0,y_0$) is exemplified by functions f, g, and h:

$$I_1(P(x_0,y_0))=f(x_0,y_0)$$

$$I_2(P(x_0,y_0))=g(x_0,y_0)$$

$$I_3(P(x_0,y_0))=h(x_0,y_0).$$

21. A method as recited in claim 20, wherein the position of the pixels within the illumination source are determined by solving the differentiable functions n($x_0,y_0$) where n is exemplified by functions f, g, and h:

$$\frac{\partial f}{\partial x}\frac{\partial g}{\partial y}h + \frac{\partial h}{\partial x}\frac{\partial f}{\partial y}g + \frac{\partial g}{\partial x}\frac{\partial h}{\partial y}f - \frac{\partial f}{\partial x}\frac{\partial h}{\partial y}g - \frac{\partial g}{\partial x}\frac{\partial f}{\partial y}h - \frac{\partial h}{\partial x}\frac{\partial g}{\partial y}f \neq 0.$$

22. A method as recited in claim 19, wherein pixel modulation provides at least three intensity levels $I_n$ at each pixel position P($x_0,y_0$) according to the following three equations in which $\alpha_1, \alpha_2, \alpha_3$ are non-zero constants, and $x_0$, $y_0$ are non-zero:

$$I_1(P(x_0,y_0))=\alpha_1 \times x_0$$

$$I_2(P(x_0,y_0))=\alpha_2 \times y_0$$

$$I_3(P(x_0,y_0))=\alpha_3 \times x_0^2.$$

23. A method as recited in claim 22, wherein determining the position of the pixel modulation P($x_0,y_0$) and the proportion loss of light intensity D($x_0,y_0$), comprises registering illumination intensity and position at a sensor located at (CCD,$x_0,y_0$), the illumination intensity being associated with the mathematical relationship of pixel position within the illumination beam, such that the proportional loss of light intensity and position of pixel modulation are resolved by the following equations:

$$x_0 = \frac{a_1 \times I_3}{a_3 \times I_1}$$

$$y_0 = \frac{a_1^2 \times I_2 \times I_3}{a_2 \times a_3 \times I_1^2}$$

$$D(x_0, y_0) = \frac{a_3 \times I_1^2}{a_1^2 \times I_3}.$$

24. An apparatus for determining the coordinates of points on an illuminated object by sensing the intensity of reflected illumination, comprising:
   (a) a source of illumination having a plurality of pixels whose intensity $I_n$ may be individually modulated according to at least three mathematical relationships;
   (b) an image sensor positioned to receive said source of illumination as it reflects from the object; and
   (c) a computer processor coupled to said intensity modulator and said image sensor, said computer processor solving simultaneous equations relating illumination intensity to pixel position such that the proportional loss of illumination intensity and associated location at the point of modulation of each registered pixels is resolved and from which the coordinates of object points may then be determined by triangulation;
   (d) wherein the illumination intensity $I_n$ is modulated at a point of modulation $P(x_0,y_0)$, to express the following relationships, in which $\alpha_1$, $\alpha_2$, $\alpha_3$ are non-zero constants, and $x_0$, $y_0$ are non-zero:

$I_1(P(x_0,y_0))=\alpha_1 \times x_0$ $I_1(P(x_0,y_0))=\alpha_2 \times y_0$ $I_3(P(x_0,y_0))=\alpha_3 \times x_0^2$;

(e) wherein said computer processor performs computations on pixel intensity and location as received by the sensor at location $(CCD,x_0,y_0)$, wherein the following equations are solved for measured illumination intensity to determine position $P(x_0,y_0)$ and proportional loss of illumination intensity $D(x_0,y_0)$ for the point of modulation, as given by:

$$x_0 = \frac{a_1 \times I_3}{a_3 \times I_1}$$

$$y_0 = \frac{a_1^2 \times I_2 \times I_3}{a_2 \times a_3 \times I_1^2}$$

$$D(x_0, y_0) = \frac{a_3 \times I_1^2}{a_1^2 \times I_3}$$

from which the coordinates of the object may then be calculated by geometric triangulation.

25. A method of obtaining object coordinates by sensing reflected illumination, comprising:
   (a) illuminating an object with a beam of electromagnetic radiation having a plurality of pixels whose intensity is individually modulated according to at least three mathematical functions of pixel position within the beam;
   (b) registering the location and intensity of the electromagnetic illumination reflected from the object at a sensor in response to the intensity of each of the modulated pixels;
   (c) determining the associated position for each pixel at the position pixel intensity modulation and the proportional loss of illumination intensity for the pixels by resolving the simultaneous equations relating pixel illumination intensity at the sensor location; and
   (d) determining object coordinates from the computed proportional loss of light intensity and pixel position by geometric triangulation;
   (e) wherein pixel modulation provides at least three intensity levels $I_n$ at each pixel position $P(x_0,y_0)$ according to the following three equations in which $\alpha_1$, $\alpha_2$, $\alpha_3$ are non-zero constants, and $x_0$, $y_0$ are non-zero:

$I_1(P(x_0,y_0))=\alpha_1 \times x_0$ $I_2(P(x_0,y_0))=\alpha_2 \times y_0$ $I_3(P(x_0,y_0))=\alpha_3 \times x_0^2$;

(f) wherein determining the position of the pixel modulation $P(x_0,y_0)$ and the proportional loss of illumination intensity $D(x_0,y_0)$ comprises registering illumination intensity and position at a sensor located at $(CCD,x_0,y_0)$, the illumination intensity being associated with the mathematical relationship of pixel position within the illumination beam, such that the proportional loss of illumination intensity and position of pixel modulation are resolved by the following equations:

$$x_0 = \frac{a_1 \times I_3}{a_3 \times I_1}$$

$$y_0 = \frac{a_1^2 \times I_2 \times I_3}{a_2 \times a_3 \times I_1^2}$$

$$D(x_0, y_0) = \frac{a_3 \times I_1^2}{a_1^2 \times I_3}.$$

26. A system for determining the coordinates of an object, comprising:
   (a) a source of illumination;
   (b) an optical intensity modulator, said optical intensity modulator configured to receive illumination from said illumination source, said intensity modulator having pixels whose transmissivity may be set according to a mathematical relationship with pixel position within the modulator, wherein said pixels are varied according to mathematical relationships of pixel position;
   (c) a first lens system, positioned to receive illumination which passes through said optical intensity modulator;
   (d) a second lens system, positioned to receive illumination originating from the source of illumination that has reflected from an area on the surface of the object whose surface coordinates are to be determined;
   (e) an imaging device positioned to receive illumination from the second lens system, said imaging device having pixels capable of registering the intensity of the illumination received; and
   (f) means for determining the coordinates on the surface of said object by resolving a sequence of intensity patterns created by the optical intensity modulator with the intensity patterns received upon the imaging device, wherein said means further comprises means for determining proportional intensity loss and relative location of the modulated pixels at the intensity modulator and using the distance and position information to solve for coordinate positions by triangulation.

27. A system for determining the coordinates of an object, comprising:
- an optical intensity modulator that is adapted to receive light from a light source and that has a plurality of pixels with variable respective transmissivity such that the relative transmissivity of each pixel is determined and set according to a computer-derived mathematical relationship with pixel position within the optical intensity modulator;
- wherein the optical intensity modulator is further adapted to project the light onto the object with a variable intensity pattern related to the variably transmissive pixels, such that the surface coordinates of the object may be determined based upon reflectance of the light from the object and further based upon the computer-derived mathematical relationship.

28. A system for determining the coordinates of an object by projecting an intensity-modulated light signal onto the object and measuring a parameter of the light signal reflected from the object, comprising:
- a computer that is configured to interface with and output a control signal to an optical intensity modulator having a plurality of pixels with variable relative transmissivities and positions, respectively;
- wherein the control signal is related to a computer-derived mathematical relationship between the transmissivity and position of the respective pixels and is adapted to set said transmissivity of each one of said pixels so that each one of said pixels can be distinguished from other ones of said pixels;
- whereby interfacing the computer with such an optical-intensity modulator and setting the transmissivity of the pixels with the control signal, the coordinates of the object may be determined based upon reflectance of the modulated light from the surface and further based upon the computer-derived mathematical relationship.

29. A system for determining the coordinates of an object by projecting an intensity-modulated light signal onto the object and measuring a parameter of the light signal reflected from the object, comprising:
- an imaging device positioned to receive the light signal reflected from the object and having pixels capable of registering the intensity of the light received;
- wherein the system is further adapted to determine the coordinates of said object by resolving a sequence of projected intensity patterns related to the intensity-modulated light signal projected onto the object with the intensity patterns of the reflected light received upon the imaging device and further according to a computer-generated mathematical relationship between the variable intensity across the projected intensity pattern at various respective positions across the intensity pattern.

30. A system for determining the coordinates of an object by projecting an intensity-modulated light signal onto the object and measuring a parameter of the light reflected from the object, comprising:
- a computer; and
- means associated with said computer for determining the coordinates of said object by resolving a sequence of projected intensity patterns related to the intensity-modulated light signal projected onto the object with the intensity patterns of the reflected light received upon the imaging device and further according to a computer-derived mathematical relationship between the variable respective intensities across the projected intensity pattern and a plurality of various respective positions across the intensity pattern.

31. A method for determining the coordinates of an object using an optical intensity modulator having a plurality of pixels having variable respective transmissivities that may be individually set, comprising:
- setting the transmissivity of each one of the pixels of the optical intensity modulator according to the computer-derived output signal related to a mathematical relationship between pixel transmissivity and position such that each one of said pixels can be distinguished from other ones of said pixels;
- whereby transmitting a light through the pixels of the optical intensity modulator and onto the object, reflected light from the object may be received by an imaging device and the coordinates of the object may be determined by triangulation based at least in part upon the computer-derived mathematical relationship.

32. A method for determining the coordinates of an object using an optical intensity modulator having a plurality of pixels having variable respective transmissivities that may be individually set, comprising:
- using a computer to generate a computer-derived output signal related to a mathematical relationship, wherein the transmissivity of each one of said pixels may be modulated according to the computer-derived output signal to create a sequence of light intensity patterns so that each one of said pixels can be distinguished from other ones of said pixels;
- whereby setting the transmissivity of the pixels according to the computer-derived output signal and transmitting a light through the pixels of the optical intensity modulator and onto the object, reflected light from the object may be received by an imaging device and the coordinates of the object may be determined by triangulation based at least in part upon the computer-derived mathematical relationship.

33. A method for determining the coordinates of an object using an optical intensity modulator having a plurality of pixels with variable respective transmissivities that may be individually set, comprising:
- determining the coordinates on said object at least in part by resolving mathematical relationships between a sequence of light intensity patterns transmitted through an optical intensity modulator onto the object and reflected light intensities received by an imaging device;
- wherein said resolving uses a computer-derived mathematical relationship between relative positions and transmissivities of the pixels, and wherefrom the object position may be then determined by triangulation.

* * * * *